No. 761,329. PATENTED MAY 31, 1904.
F. E. STANLEY.
BRAKE DEVICE FOR MOTOR VEHICLES.
APPLICATION FILED JAN. 30, 1903.
NO MODEL.

Witnesses
Inventor
Francis E. Stanley
By
Attorneys

No. 761,329. Patented May 31, 1904.

UNITED STATES PATENT OFFICE.

FRANCIS E. STANLEY, OF NEWTON, MASSACHUSETTS.

BRAKE DEVICE FOR MOTOR-VEHICLES.

SPECIFICATION forming part of Letters Patent No. 761,329, dated May 31, 1904.

Application filed January 30, 1903. Serial No. 141,177. (No model.)

*To all whom it may concern:*

Be it known that I, FRANCIS E. STANLEY, a citizen of the United States, residing at Newton, county of Middlesex, and State of Massachusetts, have invented certain new and useful Improvements in Brake Devices for Motor-Vehicles, of which the following is a specification.

My invention relates to the brake devices of motor-vehicles; and it consists in combining with the brake-wheel and yoke a band contracting and expanding means supported by the yoke, as set forth hereinafter and illustrated by the accompanying drawings, in which—

Figure 1:
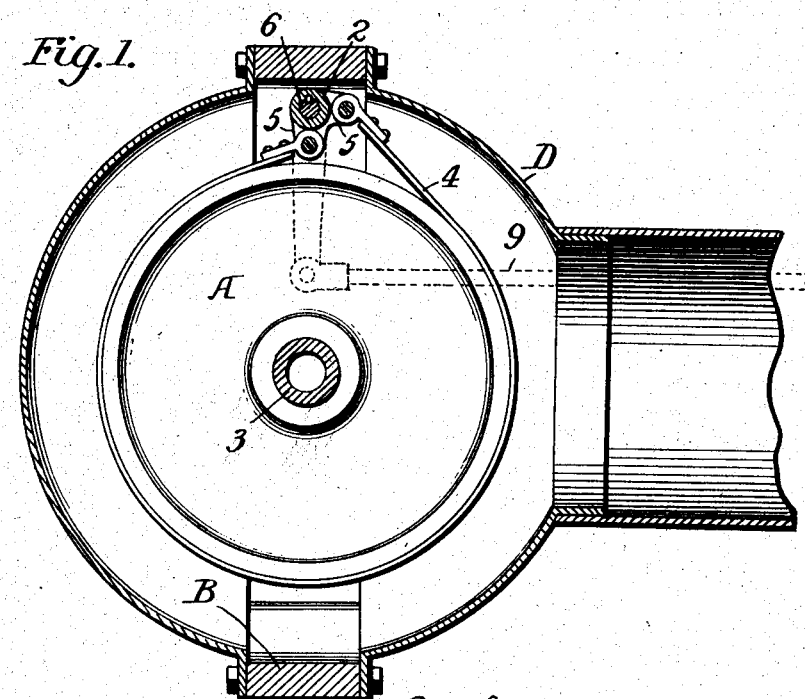
Figure 2:
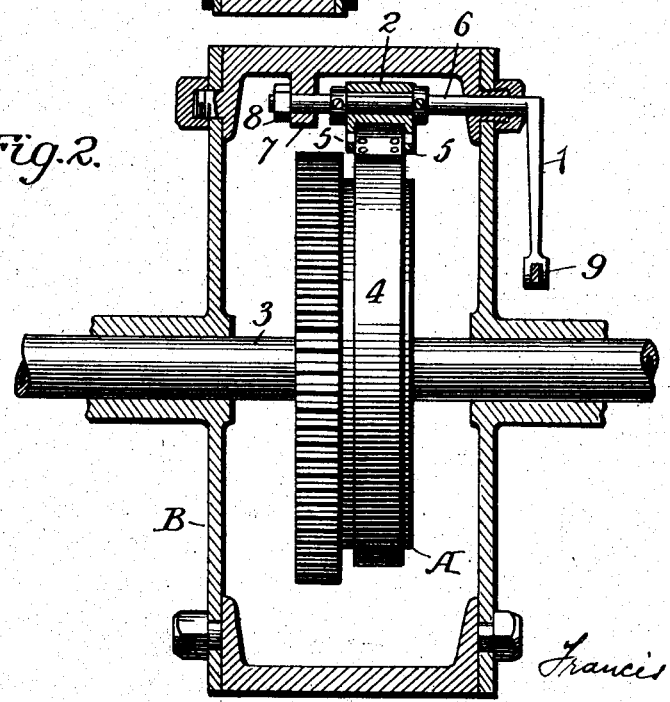

Figure 1 is a side view in part section, showing part of the compensating-gear frame of a motor-vehicle with my improved braking means; and Fig. 2 is a transverse section.

The brake-wheel A is shown as part of the compensating gear, but may be connected with the axle 3 in any suitable manner.

The brake is a metallic strap or band 4, almost completely encircling the brake-wheel and supported from above and combined with means for simultaneously drawing together both ends to secure the braking effect or to separate them, thereby so distending the loop or hoop that it will expand in all directions and move and hang at all points out of contact with the brake-wheel, thus avoiding wear when not in action. To secure this result, the supporting and operating means is arranged within the usual yoke B above and in the same vertical plane as the axis of the wheel and, as shown, consists of a hollow shaft 2, provided with two pairs of radial ears 5 5, each end of the brake-band being secured to a cross-pin extending between the ears of one of the pairs, so that on rocking the shaft 2 the two ends of the band are either drawn together or separated. To effectively operate the shaft 2, it is mounted to turn with a crankshaft 6, a spline on one entering a groove in the other, and this shaft 6 is in the same vertical plane as the axis of the wheel A and extends through an opening in the side piece of the yoke and through a lug 7 on the top piece and is secured from sliding longitudinally by a nut 8 on the end. The removal of the nut permits the withdrawal of the shaft 6 and releases the hollow shaft 2, which can be wholly removed after detaching one end of the brake-band, the frame remaining intact. The rocking of the shaft is effected by the brake-rod 9, attached to the end of the crank, and arm 1 of the shaft 6.

It will be seen that by mounting the brake-band-operating shaft on the yoke it is not necessary to slot or perforate the casing D, which incloses the gears and engine, while the removal and replacing of the casing is much more readily effected than when the arm or other operating part projects, as heretofore, through a slot in the casing. As thus arranged, the brake is equally effective against forward or rear movement.

It will be evident that when desired the ears 5 5 may be directly on the shaft 6.

Without limiting myself to the construction shown, I claim—

The combination with the axle brake-wheel of a motor-vehicle and the yoke surrounding the same, of a brake-band encircling the wheel, a rock-shaft supported by the yoke above the wheel and in the same vertical plane as the axis of the wheel, said shaft having radial ears to which the ends of the band are attached, and means for rocking said shaft, substantially as set forth.

In testimony whereof I have signed my name to this specification in the presence of two subscribing witnesses.

FRANCIS E. STANLEY.

Witnesses:
J. W. BACON,
C. F. BACON.